(12) United States Patent
Bragstad et al.

(10) Patent No.: US 9,736,232 B2
(45) Date of Patent: *Aug. 15, 2017

(54) DEPLOYING A PORTION OF A STREAMING APPLICATION TO ONE OR MORE VIRTUAL MACHINES ACCORDING TO HARDWARE TYPE

(71) Applicant: International Business Machines Corporation, Armonk, NY (US)

(72) Inventors: Lance Bragstad, Pine Island, MN (US); Michael J. Branson, Rochester, MN (US); Bin Cao, Rochester, MN (US); James E. Carey, Rochester, MN (US); Mathew R. Odden, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 601 days.

This patent is subject to a terminal disclaimer.

(21) Appl. No.: 14/265,316

(22) Filed: Apr. 29, 2014

(65) Prior Publication Data

US 2015/0281314 A1    Oct. 1, 2015

Related U.S. Application Data

(63) Continuation of application No. 14/227,176, filed on Mar. 27, 2014, now Pat. No. 9,401,946.

(51) Int. Cl.
*G06F 15/17* (2006.01)
*G06F 15/167* (2006.01)
(Continued)

(52) U.S. Cl.
CPC ...... *H04L 67/1008* (2013.01); *H04L 41/0806* (2013.01); *H04L 41/0896* (2013.01);
(Continued)

(58) Field of Classification Search
CPC .................................................. H04L 41/0806
(Continued)

(56) References Cited

U.S. PATENT DOCUMENTS 7,203,944 B1 *  4/2007   van Rietschote ... G06F 9/45533
                                                        718/1
8,060,614 B2   11/2011   Goldstein et al.
(Continued)

OTHER PUBLICATIONS

Zinn et al., "Streaming Satellite Data to Could Workflows for On-Demand Computing of Environmental Products," Workflows in Support of Large-Scale Science (Works), 2010, 5th Workshop, pp. 1-7.

*Primary Examiner* — Yves Dalencourt
*Assistant Examiner* — Sahera Halim
(74) *Attorney, Agent, or Firm* — Martin & Associates, LLC; Derek P. Martin (57) ABSTRACT

A streams manager monitors performance of a streaming application, and when the performance needs to be improved, the streams manager requests a cloud manager provision one or more VMs on a server that has a specified hardware type, and optionally has specified available hardware capacity. In response, the cloud manager determines which available servers have the specified hardware type, and when available hardware capacity is specified, further determines which of the available servers with the specified hardware type have the specified available capacity. When there are multiple servers that satisfy the request from the streams manager, the cloud manager determines from historical performance logs for the servers which is preferred. The cloud manager then provisions the requested VM(s) on the specified hardware type and returns the requested VM(s) to the streams manager. The streams manager then deploys a portion of the streaming application to the VM(s).

9 Claims, 10 Drawing Sheets

(51) Int. Cl.
  *G06F 15/177* (2006.01)
  *H04L 29/08* (2006.01)
  *H04L 29/06* (2006.01)
  *H04L 12/24* (2006.01)
  *H04L 12/26* (2006.01)

(52) U.S. Cl.
  CPC ...... *H04L 41/5009* (2013.01); *H04L 41/5025* (2013.01); *H04L 43/16* (2013.01); *H04L 65/4069* (2013.01); *H04L 65/80* (2013.01); *H04L 67/1031* (2013.01); *H04L 67/12* (2013.01); *H04L 41/5096* (2013.01)

(58) Field of Classification Search
  USPC .......................... 709/219, 224, 226, 221, 235
  See application file for complete search history.

(56) References Cited

U.S. PATENT DOCUMENTS

| | | |
|---|---|---|
| 8,214,521 B2* | 7/2012 | Takagi .................. G06F 9/5038 709/235 |
| 9,401,946 B2* | 7/2016 | Bragstad ............. H04L 41/5025 |
| 2011/0041132 A1 | 2/2011 | Andrade et al. |
| 2013/0173587 A1 | 7/2013 | Imaki et al. |
| 2013/0297802 A1 | 11/2013 | Laribi et al. |
| 2015/0277944 A1 | 10/2015 | Wang |

* cited by examiner

FIG. 17

DEPLOYING A PORTION OF A STREAMING APPLICATION TO ONE OR MORE VIRTUAL MACHINES ACCORDING TO HARDWARE TYPE

BACKGROUND

1. Technical Field

This disclosure generally relates to streaming applications, and more specifically relates to enhancing performance of a streaming application by deploying a portion of the streaming application to one or more virtual machines according to the type of hardware on servers that could run the virtual machines.

2. Background Art

Streaming applications are known in the art, and typically include multiple operators coupled together in a flow graph that process streaming data in near real-time. An operator typically takes in streaming data in the form of data tuples, operates on the tuples in some fashion, and outputs the processed tuples to the next operator. Streaming applications are becoming more common due to the high performance that can be achieved from near real-time processing of streaming data.

Many streaming applications require significant computer resources, such as processors and memory, to provide the desired near real-time processing of data. However, the workload of a streaming application can vary greatly over time. Allocating on a permanent basis computer resources to a streaming application that would assure the streaming application would always function as desired (i.e., during peak demand) would mean many of those resources would sit idle when the streaming application is processing a workload significantly less than its maximum. Furthermore, what constitutes peak demand at one point in time can be exceeded as the usage of the streaming application increases. For a dedicated system that runs a streaming application, an increase in demand may require a corresponding increase in hardware resources to meet that demand.

BRIEF SUMMARY

A streams manager monitors performance of a streaming application, and when the performance needs to be improved, the streams manager requests a cloud manager provision one or more VMs on a server that has a specified hardware type, and optionally has specified available hardware capacity. In response, the cloud manager determines which available servers have the specified hardware type, and when available hardware capacity is specified, further determines which of the available servers with the specified hardware type have the specified available capacity. When there are multiple servers that satisfy the request from the streams manager, the cloud manager determines from historical performance logs for the servers which is preferred. The cloud manager then provisions the requested VM(s) on the specified hardware type and returns the requested VM(s) to the streams manager. The streams manager then deploys a portion of the streaming application to the VM(s).

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

A streams manager monitors performance of a streaming application, and when the performance needs to be improved, the streams manager requests a cloud manager provision one or more VMs on a server that has a specified hardware type, and optionally has specified available hardware capacity. In response, the cloud manager determines which available servers have the specified hardware type, and when available hardware capacity is specified, further determines which of the available servers with the specified hardware type have the specified available capacity. When there are multiple servers that satisfy the request from the streams manager, the cloud manager determines from historical performance logs for the servers which is preferred. The cloud manager then provisions the requested VM(s) on the specified hardware type and returns the requested VM(s) to the streams manager. The streams manager then deploys a portion of the streaming application to the VM(s).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 1:
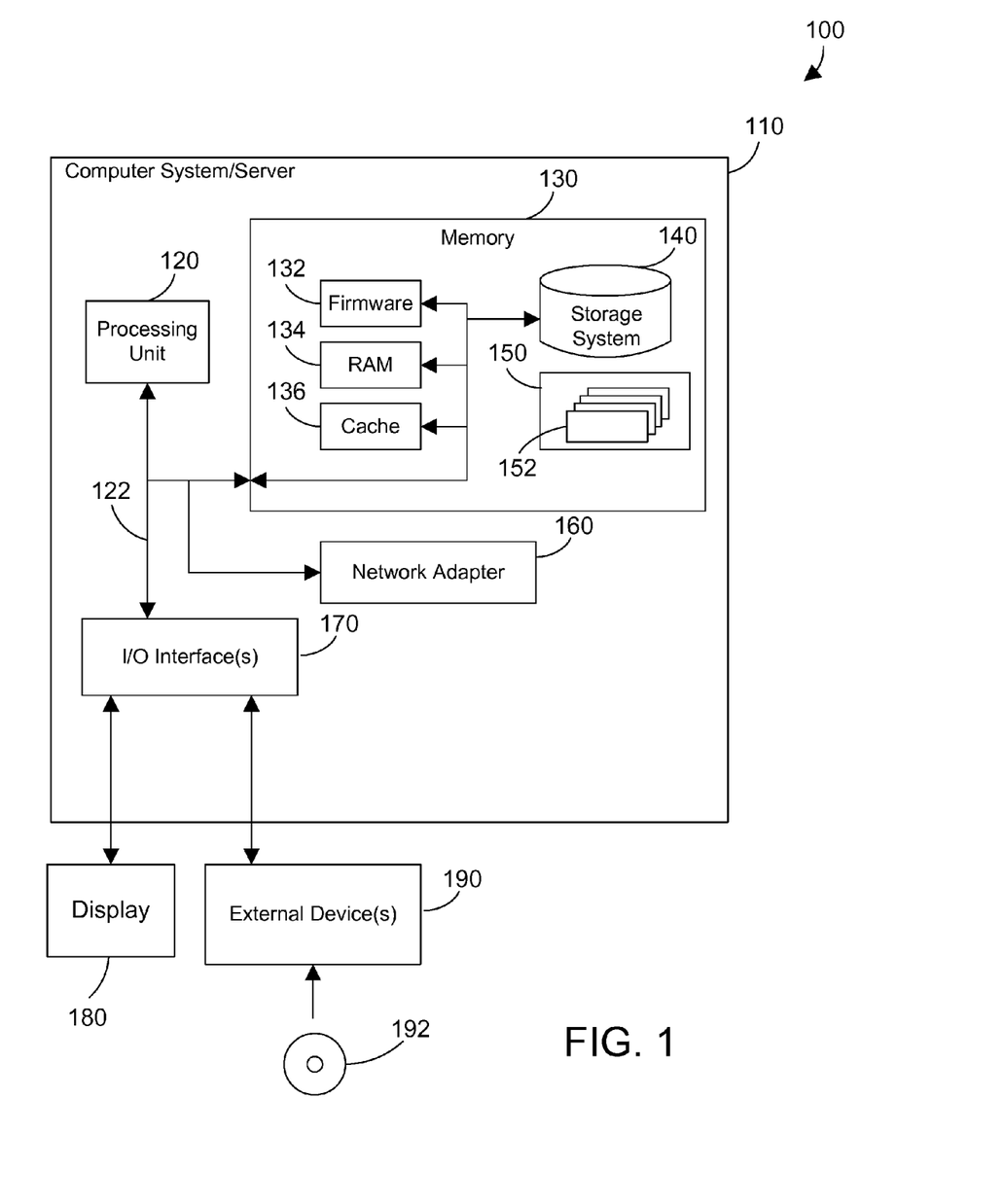
FIG. 1 is a block diagram of a cloud computing node.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
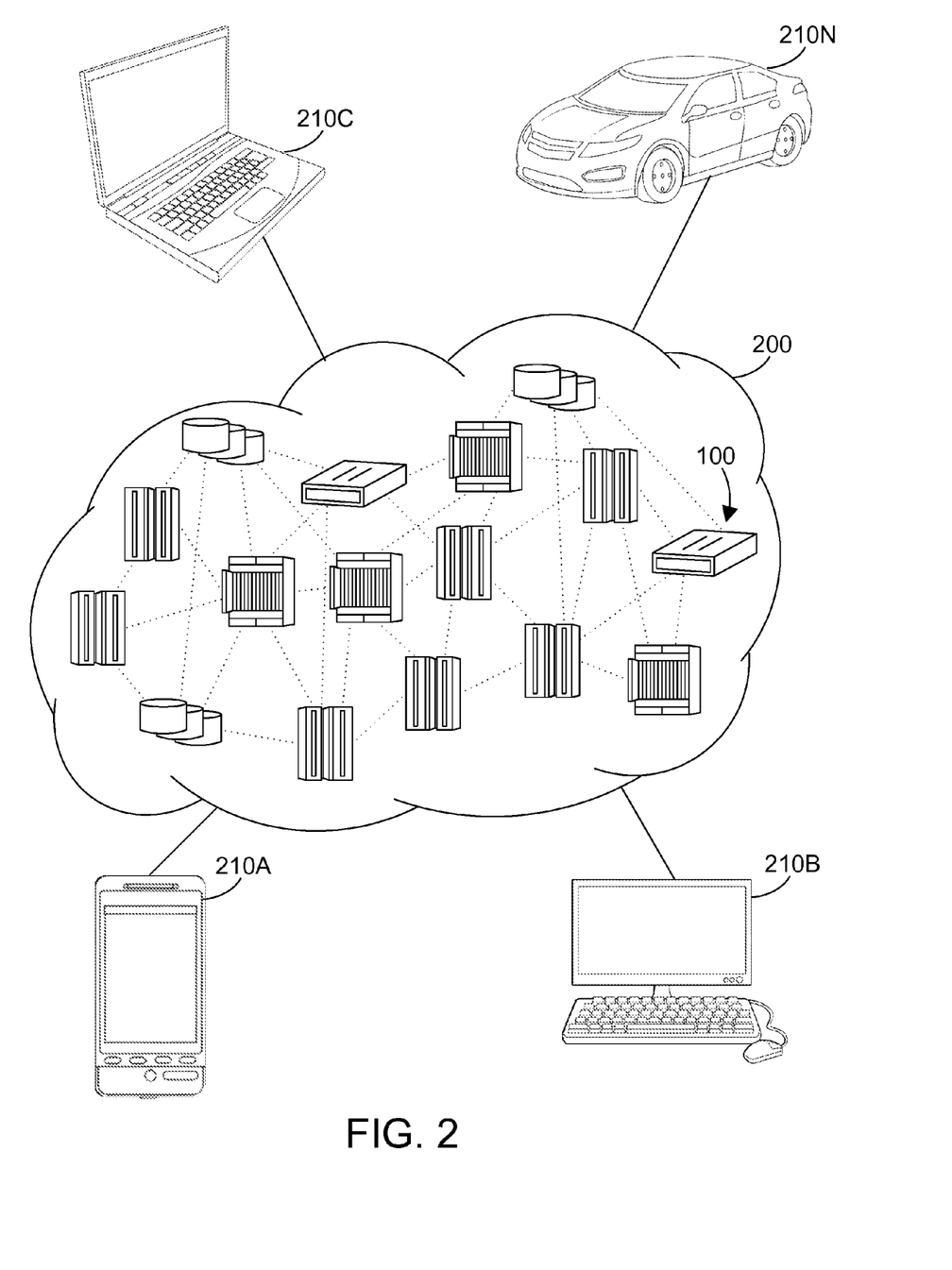
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
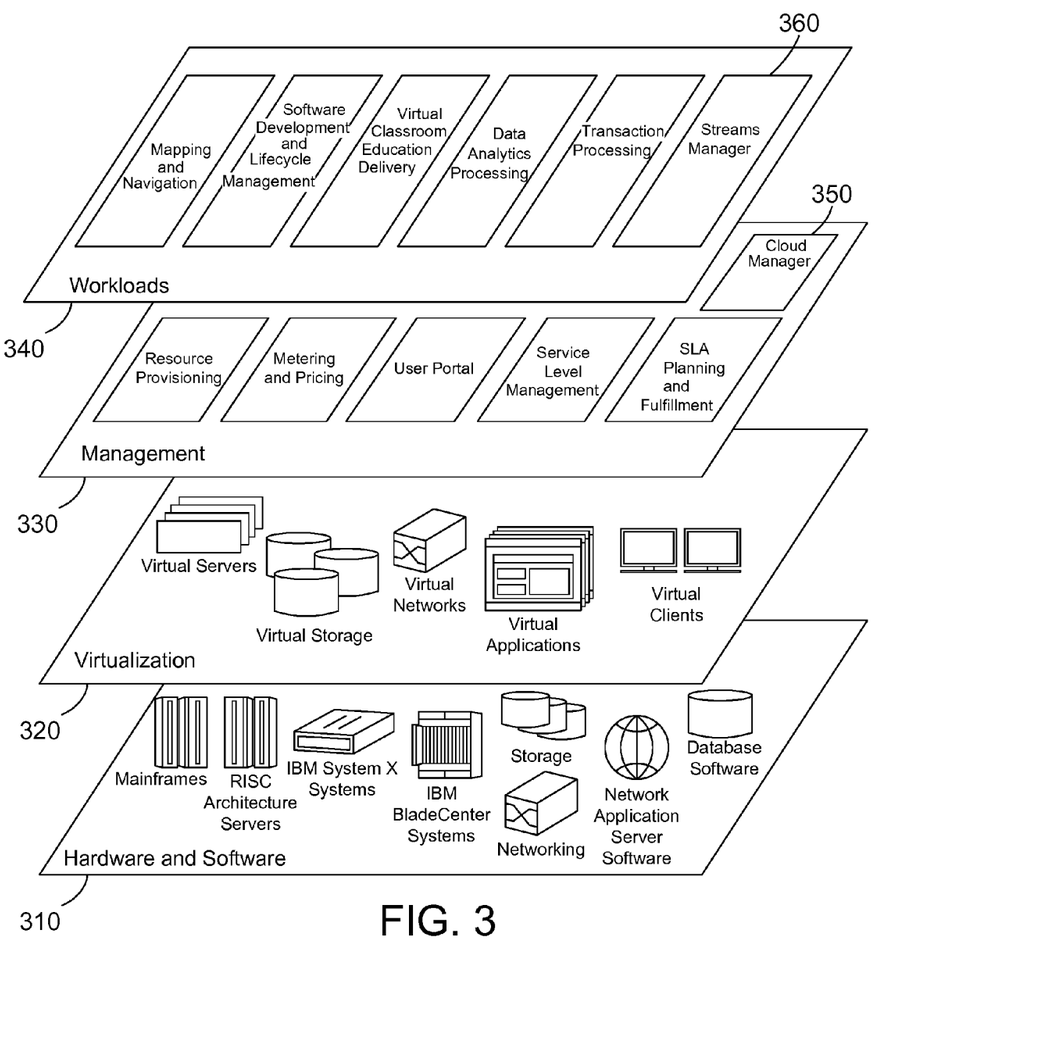
FIG. 3 is a block diagram of abstraction model layers.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM WebSphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. A cloud manager 350 is representative of a cloud manager as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a streams manager 360, as discussed in more detail below.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
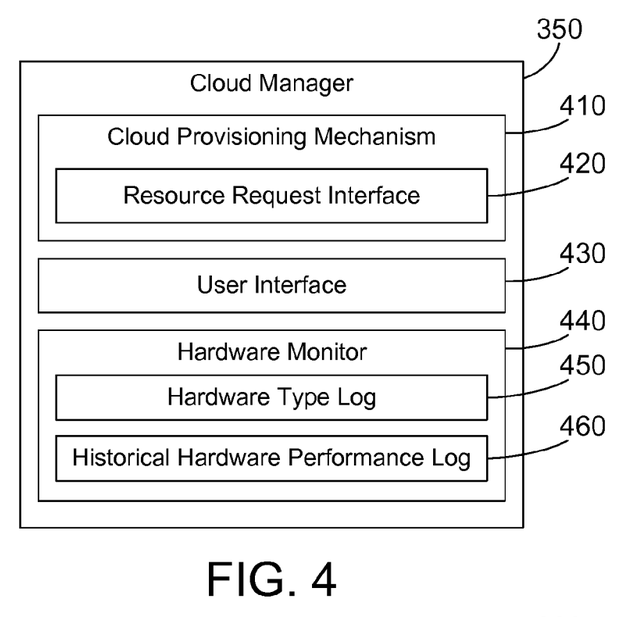
FIG. 4 is a block diagram showing some features of a cloud manager.

FIG. 4 shows one suitable example of the cloud manager 350 shown in FIG. 3. The cloud manager 350 includes a cloud provisioning mechanism 410 that includes a resource request interface 420. The resource request interface 420 allows a software entity, such as the streams manager 360, to request virtual machines from the cloud manager 350 without human intervention. The cloud manager 350 also includes a user interface 430 that allows a user to interact with the cloud manager to perform any suitable function, including provisioning of VMs, destruction of VMs, performance analysis of the cloud, etc. The difference between the resource request interface 420 and the user interface 430 is a user must manually use the user interface 430 to perform functions specified by the user, while the resource request interface 420 may be used by a software entity to request provisioning of cloud resources by the cloud mechanism 350 without input from a human user. Of course, cloud manager 350 could include many other features and functions known in the art that are not shown in FIG. 4.

Cloud manager 350 includes a hardware monitor 440 that includes a hardware type log 450 that specifies hardware type for servers on which cloud manager 350 may provision VMs, and a historical hardware performance log 460 that provides historical performance information for the servers on which cloud manager 350 may provision VMs. The hardware monitor 440 and its associated logs 450 and 460 are described in more detail below.

Figure 5:
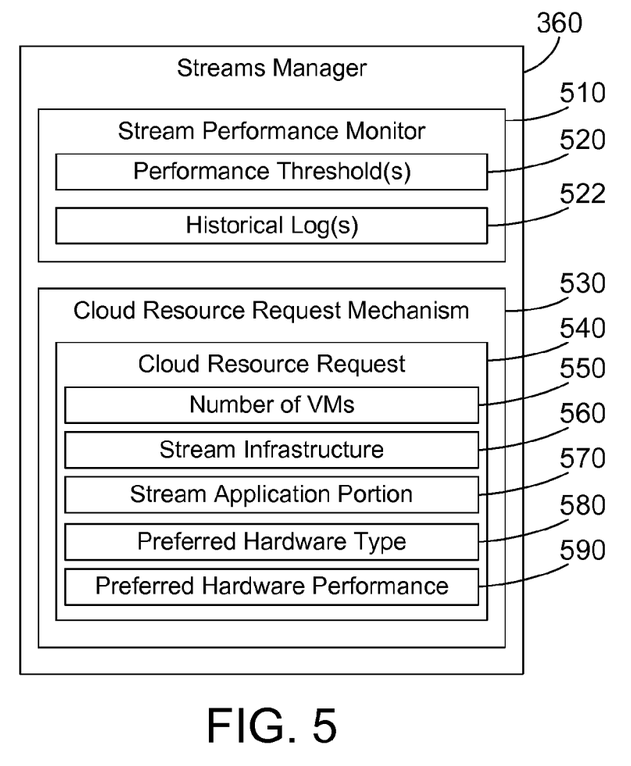
FIG. 5 is a block diagram showing some features of a streams manager.

FIG. 5 shows one suitable example of the streams manager 360 shown in FIG. 3. The streams manager 360 is software that manages one or more streaming applications, including creating operators and data flow connections between operators in a flow graph that represents a streaming application. The streams manager 360 includes a performance monitor 510 with one or more performance thresholds 520. Performance thresholds 520 can include static thresholds, such as percentage used of current capacity, and can also include any suitable heuristic for measuring performance of a streaming application as a whole or for measuring performance of one or more operators in a streaming application. Performance thresholds 520 may include different thresholds and metrics at the operator level, at the level of a group of operators, and/or at the level of the overall performance of the streaming application. Performance of a streaming application may also be measured by comparing current performance to past performance in one or more historical logs 522. Note the performance measured can include performance for a single operator, performance for a group of operators, and performance for the streaming application as a whole. The stream performance monitor 510 monitors performance of a streaming application, and when current performance compared to the one or more performance thresholds 520 or compared to the historical log(s) 522 indicates current performance needs to be improved, the streams manager 360 requests a cloud manager to provision one or more VMs that will host one or more operators in the streaming application, thereby improving performance of the streaming application.

The streams manager 360 determines a portion of the streaming application to deploy to one or more VMs. Note the portion of the streaming application may be a single operator or may be multiple operators. The streams manager 360 uses a cloud resource request mechanism 530 to formulate a cloud resource request 540, which can include information such as a number of VMs to provision 550, stream infrastructure needed in each VM 560, a stream application portion 570 (e.g., one or more operators) for each VM, preferred hardware type 580, and preferred hardware performance 590. Preferred hardware type 580 specifies a desired hardware architecture type for a server on which the VM(s) will be provisioned. Examples of known hardware types include x86 hardware, Power hardware, Z hardware, IBM Cell hardware, ARM hardware, scalable processor architecture (SPARC) hardware and Intel Itanium hardware. In one specific implementation, the streams manager 360 determines hardware type that is currently executing the portion, and specifies a preferred hardware type 580 as the same hardware type that is currently execution the portion. Limiting the hardware type of servers that run VMs in the cloud to the same hardware type currently executing the portion allows an apples-to-apples comparison of performance, because the performance of a VM on the same hardware type should be similar to the performance of the VM on the same hardware type in the cloud. This is an advantage for the streams manager to have the capability of specifying a preferred hardware type as described herein.

Figure 11:
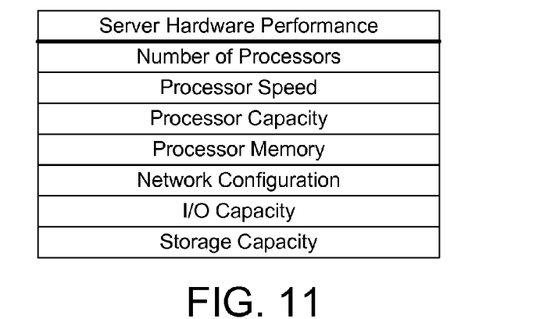
FIG. 11 is a block diagram showing possible categories of hardware performance that could be specified in a request to a cloud manager.

In one suitable implementation, the preferred hardware performance 590 specifies desired hardware capacity on a server to which a VM could be provisioned by the cloud manager. FIG. 11 shows examples of server hardware performance that could be specified in the preferred hardware performance 590, which includes number of processors, processor speed, processor capacity, processor memory, network configuration (e.g., dual switch, virtual local area network (VLAN), fiber, etc.), I/O capacity, and storage capacity. As part of the cloud resource request 540, the preferred hardware performance 590 can specify one or more criteria that a server should meet for the cloud manager to provision a VM to that server. Note that the preferred hardware performance 590 is optional. A cloud resource request 540 may specify a preferred hardware type 580, and may optionally specify the preferred hardware performance 590. Once the cloud resource request 540 is formulated, the streams manager 360 submits the cloud resource request 540 to a cloud manager, such as cloud manager 350 shown in FIGS. 3 and 4.

The cloud resource request can be formatted in any suitable way. A simple example will illustrate two suitable ways for formatting a cloud resource request. Let's assume the streams manager determines it needs two VMs, where both have common stream infrastructure, with a first of the VMs hosting operator A and the second of the VMs hosting operator B. The cloud resource request 540 in FIG. 5 could specify two VMs at 550, could specify the common stream infrastructure, such as an operating system and middleware, at 560, could specify operator A and operator B at 570, and could specify x86 as the preferred hardware type 580, with no preferred hardware performance 590. In response, the cloud manager would provision two VMs on one or two x86 servers with the common stream infrastructure, with the first of the VMs hosting operator A and the second of the VMs hosting operator B. In the alternative, the cloud resource request 540 could be formulated such that each VM is specified with its corresponding stream infrastructure and stream application portion. In this configuration, the cloud resource request would specify a first VM with the common stream infrastructure and operator A on an x86 server, and a second VM with the common stream infrastructure and operator B on an x86 server.

Figure 6:
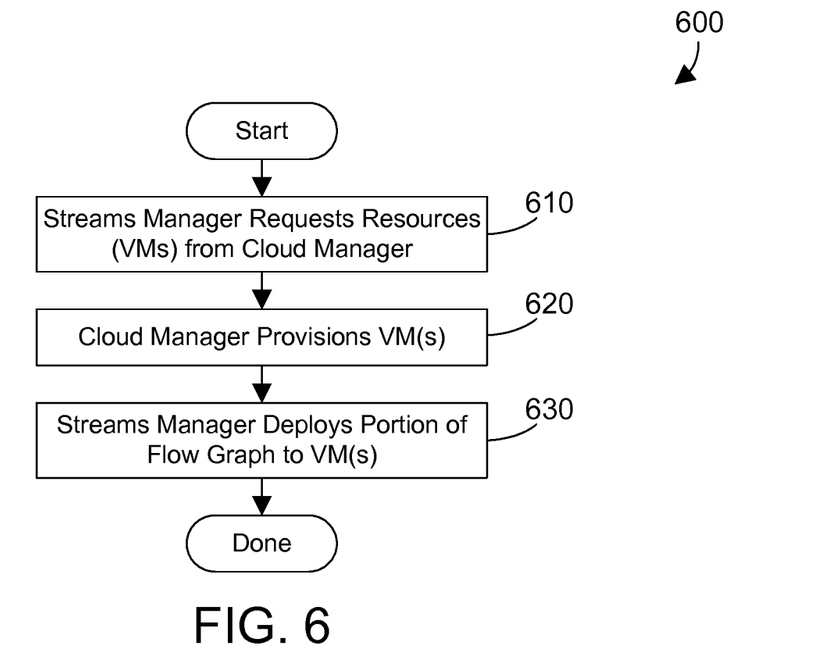
FIG. 6 is a flow diagram of a method for a streams manager to request and receive from a cloud manager virtual machines to improve performance of a streaming application.

Referring to FIG. 6, a method 600 shows one suitable example for enhancing performance of a streaming application, and is preferably performed by the streams manager 360 interacting with the cloud manager 350. The streams manager requests resources, such as VMs, from the cloud manager (step 610). The cloud manager provisions the VMs (step 620). The streams manager then deploys a portion of the flow graph to the VMs (step 630). When the streaming application is not initially hosted in the cloud, the result will be a hybrid implementation of the streams application, with some portions hosted on a dedicated computer system and other portions hosted by one or more VMs in the cloud. Because the preferred hardware type for VMs can be specified, even such a hybrid implementation can result in all operators running on the same hardware type.

Figure 7:
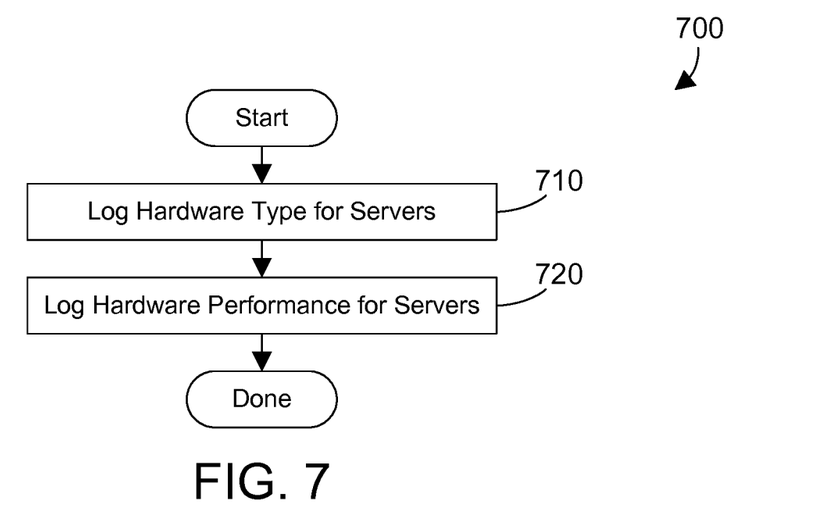
FIG. 7 is a flow diagram of a method for a cloud manager to log hardware-related data relating to servers on which it may provision virtual machines.

FIG. 7 shows one suitable example of a method 700 for a cloud manager to log hardware-related information for servers to which it can provision virtual machines. Hardware type for servers is logged (step 710), which can produce the hardware type log 450 shown in FIG. 4. Hardware performance for the servers is also logged (step 720). The log of hardware performance in step 720 can produce the historical hardware performance log 460 shown in FIG. 4. By logging hardware-related information for the servers available to it, the cloud manager can fulfill requests from the streams manager to deploy one or more operators to virtual machines running on servers that have a specified hardware type.

Figure 8:
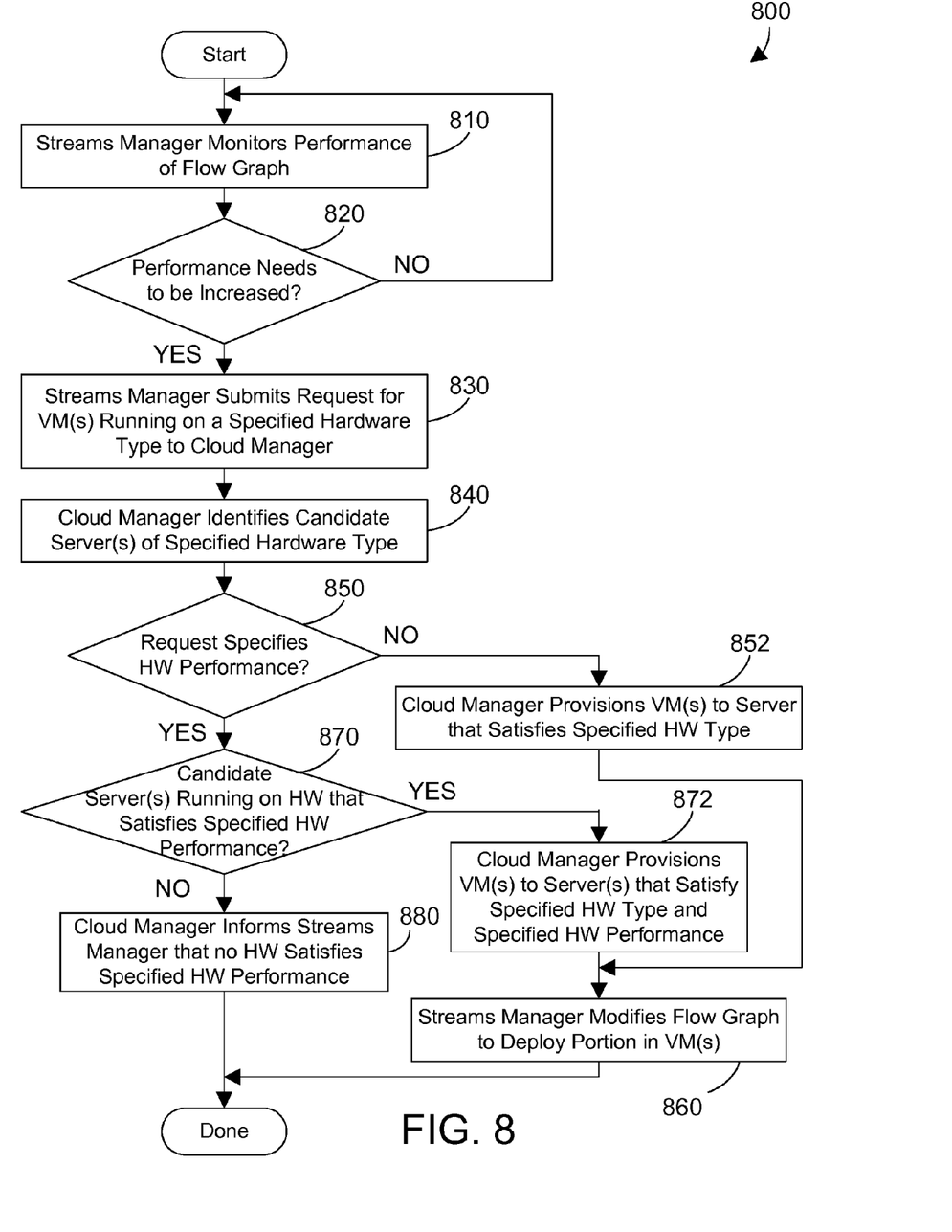
FIG. 8 is a flow diagram of a method for improving performance of a streaming application by deploying one or more portions of a flow graph to one or more VMs according to specified hardware type.

Referring to FIG. 8, a method 800 shows how a streams manage can monitor and improve performance of a streaming application by deploying a portion of the streaming application to one or more VMs in a cloud. Method 800 is one specific implementation for method 600 shown in FIG. 6. The streams manager monitors performance of a flow graph corresponding to a streaming application (step 810). When performance does not need to be increased (step 820=NO), method 800 loops back to step 810 and continues. When performance needs to be increased (step 820=YES), the streams manager generates and submits to the cloud manager a request for one or more VMs running on one or more servers of a specified hardware type (step 830). Cloud resource request 540 shown in FIG. 5 and discussed above is one suitable example of such a request. In response to receiving the request from the streams manager, the cloud manager identifies candidate VMs running on the specified hardware type (step 840). When the request from the streams manager to the cloud manager specifies desired hardware performance (step 850=YES), the cloud manager determines whether any of the candidate servers running on the specified hardware type satisfies the specified hardware performance (step 870). When there is no candidate server that satisfies both the specified hardware type and the specified hardware performance (step 870=NO), the cloud manager informs the streams manager that no hardware is available that satisfies the specified hardware performance (step 880). When the request from the streams manager to the cloud manager does not specify hardware performance (step 850=NO), the cloud manager provisions one or more VMs to a server that satisfies the specified hardware type (step 852). The streams manager then modifies the flow graph to deploy a portion of the flow graph to the one or more VMs provisioned by the cloud manager (step 860). When the request specifies hardware performance (step 850=YES) and one or more candidate servers running on the specified hardware type satisfy the specified hardware performance (step 870=YES), the cloud manager provisions one or more VMs to one or more servers that satisfy the specified hardware type and specified hardware performance (step 872). The streams manager then modifies the flow graph to deploy a portion of the flow graph to the one or more VMs (step 860). Method 800 is then done.

Figure 9:
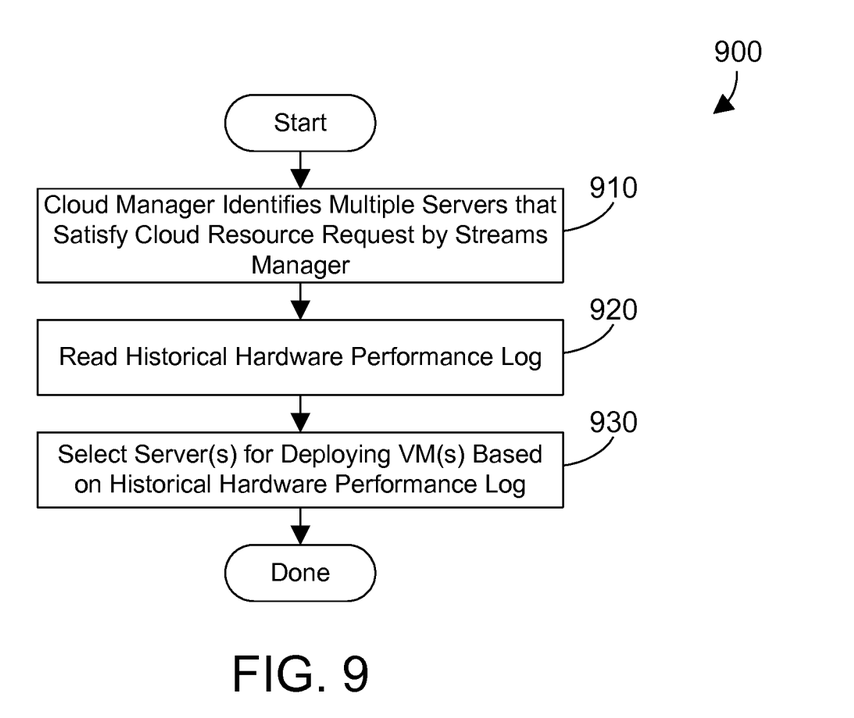
FIG. 9 is a flow diagram of a method for a cloud manager to determine from a historical hardware performance log which of multiple servers that satisfy a request by a streams manager to select for provisioning the requested VM(s)

What is the cloud manager to do when more servers satisfy the cloud resource request received from the streams manager than are needed? In one case, the cloud manager could simply choose one or more of the multiple servers. In another case, the cloud manager could choose one or more of the multiple servers based on some simple criteria, such as which one has the most available capacity. However, the cloud manager can also make a more intelligent choice based on logged historical hardware performance for the servers, as shown in method 900 in FIG. 9. The cloud manager identifies multiple servers that satisfy the cloud resource request by the streams manager (step 910). The cloud manager then reads the historical hardware performance log (step 920). The cloud manager then selects one or more servers for provisioning the requested VM(s) based on the historical performance log (step 930). Method 900 is then done.

Figure 10:
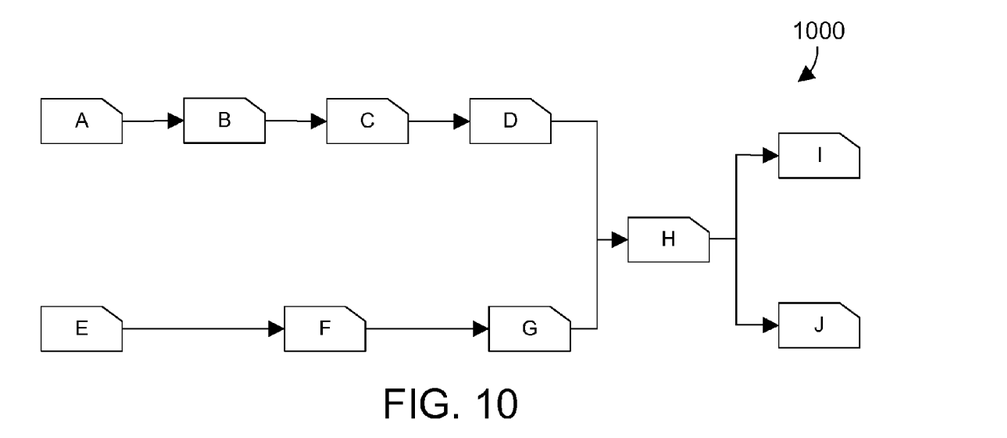
FIG. 10 is a flow graph of one suitable example of a streaming application.

A simple example is provided in FIGS. 10-17 to illustrate many of the concepts discussed above. Referring to FIG. 10, a streaming application 1000 includes operators A, B, C, D, E, F, G, H, I and J as shown. Operator A originates a stream of tuples, which is processed by operator B, which outputs tuples. The tuples from operator B are processed by operator C, which outputs tuples to operator D, which processes the tuples and outputs its tuples to operator H. In similar fashion, operator E originates a stream of tuples, which is processed by operator F, which outputs tuples that are processed by operator G, which outputs tuples to operator H. Note that operator H receives tuples from both operator D and operator G. Operator H processes the tuples it receives from operator D and from operator G, and outputs its tuples to operators I and J. We assume for this example the streaming application 1000 runs on a dedicated system, such as a computer system/server 100 shown in FIG. 1. We further assume for this example the dedicated system includes x86 hardware, which means all of the operators shown in FIG. 10 are initially running on dedicated x86 hardware.

Figure 12:
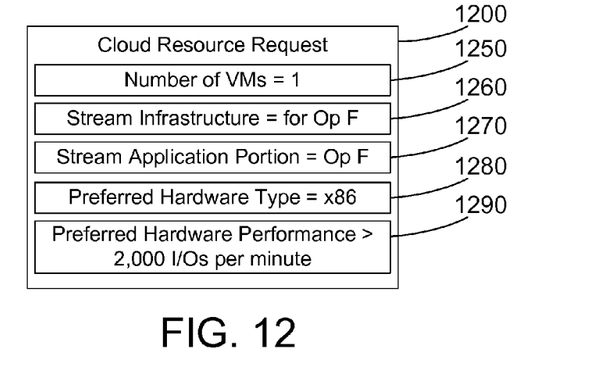
FIG. 12 is a block diagram showing one specific example of a cloud request from a streams manager when operator F in FIG. 10 needs to be deployed to a VM in a cloud.

The stream performance monitor 510 in FIG. 5 monitors performance of the streaming application 1000 in FIG. 10 in accordance with one or more defined performance thresholds 520 and/or historical log(s) 522. An example of a suitable performance threshold 520 is percent of capacity used. A performance threshold of say, 80% could be specified for operator F in FIG. 10. Note a performance threshold can apply to a specified operator, to a specified a group of operators, or to all operators in the streaming application. We assume the streaming application 1000 in FIG. 10 initially runs with operator F operating at less than 80% capacity, but due to increased demand, the performance of operator F grows to exceed 80% capacity. In response to the performance of operator F exceeding the 80%defined performance threshold, the streams manager requests cloud resources to relieve the load on operator F. For example, the streams manager could formulate a cloud resource request 1200 as shown in FIG. 12, which is one suitable example for cloud resource request 540 shown in FIG. 5. The cloud resource request 1200 specifies one VM at 1250, specifies a stream infrastructure needed to run operator F at 1260, specifies operator F as the portion of the streaming application to be deployed to the VM, specifies a preferred hardware type as x86, and specifies preferred hardware performance as greater than 2,000 I/Os per minute at 1290.

Figure 13:
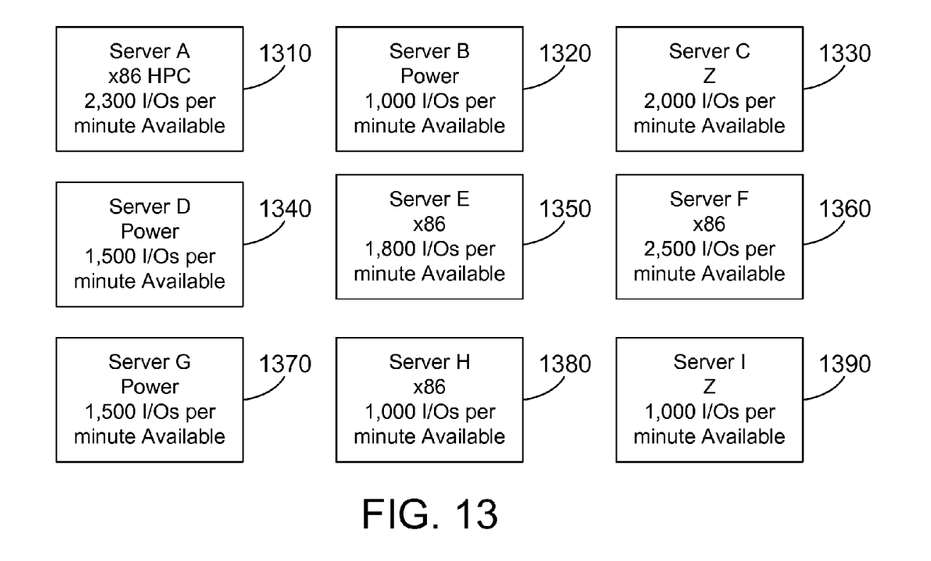
FIG. 13 is a block diagram of nine suitable hardware servers to which the cloud manager that receives the request in FIG. 12 could provision the requested VM.
Figure 14:
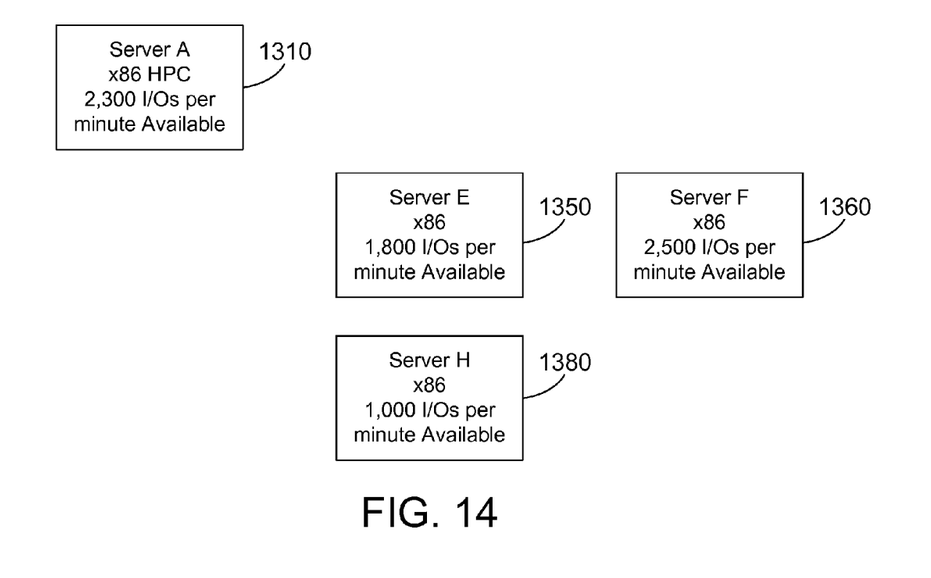
FIG. 14 is a block diagram showing which of the hardware servers in FIG. 13 satisfy the specification of preferred hardware type 1280 in the cloud resource request 1200 in FIG. 12.
Figures 15, 16:
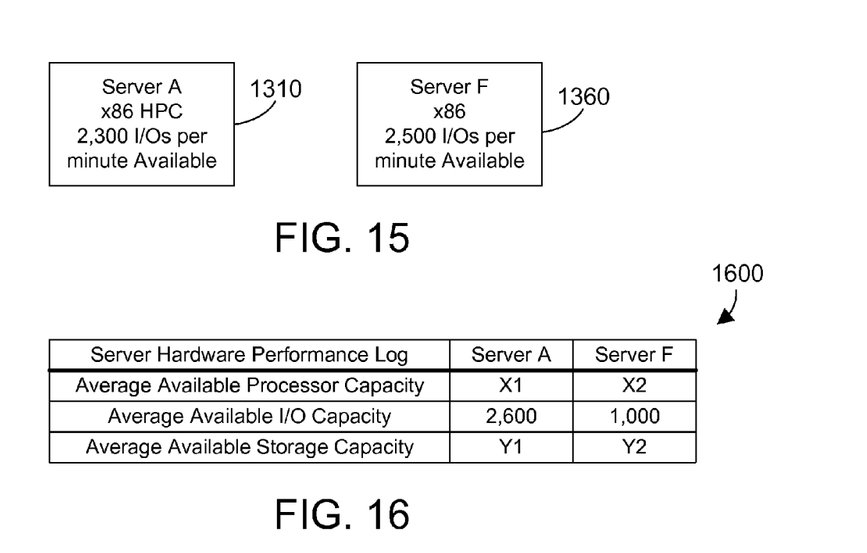
FIG. 15 is a block diagram showing which of the hardware servers in FIG. 14 satisfy the preferred hardware performance 1290 in the cloud resource request 1200 in FIG. 12.
FIG. 16 is a block diagram of a sample server hardware performance log showing historical available capacity for the two servers in FIG. 15.
Figure 17:
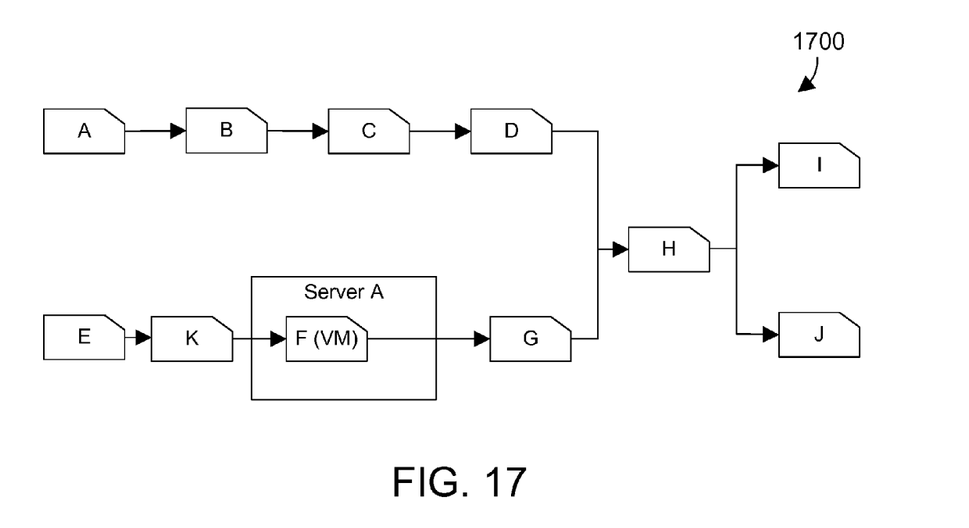
FIG. 17 is a flow graph of the streaming application 1700, which represents the streaming application 1000 shown in FIG. 10 after operator F has been deployed to a virtual machine that has been provisioned to Server A shown in FIG. 15.

We assume the cloud manager could provision a VM to any of nine different servers, as shown in FIG. 13. Server A 1310, Server E 1350, Server F 1360 and Server H 1380 are servers running on x86 hardware. Note Server A 1310 is running x86 high performance computing (HPC) hardware, which means Server A 1310 includes multiple x86 processors in a parallel processing environment that can be requested and used in groups. Server B 1320, Server D 1340 and Server G 1370 are servers running on Power hardware. Server C 1330 and Server I 1390 are servers running on Z hardware. With the cloud resource request 1200 in FIG. 12, the servers in FIG. 13 that satisfy the preferred hardware type of x86 are shown in FIG. 14 to include Server A 1310, Server E 1350, Server F 1360 and Server H 1380, which are servers that are all running on x86 hardware. We note, however, that the available I/O capacity for these four servers in FIG. 14 varies, and some of the servers do not satisfy the specified preferred hardware performance of 2,000 I/Os per minute. Of the four servers shown in FIG. 14, only two satisfy the specified hardware performance of 2,000 I/Os per minute, as shown in FIG. 15. Server A 1310 and Server F 1360 both satisfy the preferred hardware type and the preferred hardware performance in the cloud resource request 1200 in FIG. 12. With two different servers available, the cloud manager could simply pick one of the two for provisioning the requested one VM. The cloud manager could look at the current I/O capacity, and could select Server F 1360 for provisioning the requested one VM because it has greater I/O capacity than Server A 1310. Or the cloud manager could make a more intelligent decision using a method like method 900 shown in FIG. 9. Instead of making a random decision or a decision based on current capacity, instead a decision can be based on data in a historical hardware performance log 1600 as shown in FIG. 16. The server hardware performance log 1600 could include average available processor capacity for each of the servers, could include average available I/O capacity for each of the servers, and could include average available storage capacity for each of the two servers. Because the preferred hardware performance 1290 in the cloud resource request 1200 in FIG. 12 is in terms of I/O, numerical values in FIG. 16 are not given for average available processor capacity (X1 and X2) and for average available storage capacity (Y1 and Y2). Note the logged data for servers other than Server A and Server F are not show for simplification. When the cloud manager reads the server hardware performance log 1600 in FIG. 16, the cloud manager discovers that even though Server F 1360 currently has 2,500 I/Os per minute in available capacity as shown in FIG. 15, historically the available I/O capacity for Server F is only 1,000, as shown in FIG. 16. This could mean that Server F could become much busier in the future, which could impair the function of an operator deployed to Server F. The cloud manager also discovers that even though Server A 1310 currently has 2,300 I/Os per minute in available capacity as shown in FIG. 15, historically the available I/O capacity for Server A is 2,600, as shown in FIG. 16. The historical capacity of Server A is thus much higher than the historical capacity for Server F. As a result, using the data in the server hardware performance log 1600 in FIG. 16, the cloud manager could select Server A, and provision a VM to server A. The streams manager, when it receives the VM provisioned on Server A, deploys operator F on the VM in Server A, as shown in the flow diagram 1700 in FIG. 17. The result is an operator (namely, operator F) that has been deployed to a VM that is executing on a server that has a specified hardware type and that satisfies a specified hardware performance. Note operator F in FIG. 17 is hosted on the VM in Server A, while the rest of the operators in streaming application 1700 are hosted by a dedicated computer system. The result is a hybrid system, with some operators in the streaming application 1700 hosted on the dedicated computer system while operator F is hosted in a cloud.

While the simple example in FIGS. 10-17 show operator F deployed to a VM in one server, this is not to be construed as limiting of the concepts herein. Any suitable number of operators could be deployed to any suitable number of VMs. For example, if performance of operators B, C and D all exceed one or more of the defined performance thresholds, a single VM could be provisioned with the logic for all of operators B, C and D. In addition, a VM could be provisioned to implement two different unrelated operators. For example, if operators C and F all exceed one or more of the defined performance thresholds, a single VM could be provisioned that implements both operator C and operator F. The disclosure and claims herein expressly extend to any number of virtual machines that implement any suitable number of operators.

A streams manager monitors performance of a streaming application, and when the performance needs to be improved, the streams manager requests a cloud manager provision one or more VMs on a server that has a specified hardware type, and optionally has specified available hardware capacity. In response, the cloud manager determines which available servers have the specified hardware type, and when available hardware capacity is specified, further determines which of the available servers with the specified hardware type have the specified available capacity. When there are multiple servers that satisfy the request from the streams manager, the cloud manager determines from historical performance logs for the servers which is preferred. The cloud manager then provisions the requested VM(s) on the specified hardware type and returns the requested VM(s) to the streams manager. The streams manager then deploys a portion of the streaming application to the VM(s).

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
at least one processor;
a memory coupled to the at least one processor;
a streaming application residing in the memory and executed by the at least one processor, the streaming application comprising a flow graph that includes a plurality of operators that process a plurality of data tuples; and
a streams manager residing in the memory and executed by the at least one processor, the streams manager monitoring performance of the streaming application, and when performance of a portion of the streaming application that comprises at least one of the plurality of operators needs to be improved, the streams manager submits a request to a cloud manager to provision at least one virtual machine on a specified hardware type with a specified hardware performance capacity, and after the cloud manager provisions the at least one virtual machine on the specified hardware type with the specified hardware performance capacity, the streams manager modifies the flow graph to deploy the portion of the streaming application to the at least one virtual machine.

2. The apparatus of claim 1 wherein the specified hardware type comprises a same processor architecture currently executing the portion of the streaming application.

3. The apparatus of claim 1 wherein the portion of the streaming application comprises a single operator of the plurality of operators.

4. The apparatus of claim 1 wherein the portion of the streaming application comprises at least two of the plurality of operators.

5. The apparatus of claim 1 wherein the streams manager determines when the performance of the streaming application needs to be improved by comparing current performance of the streaming application to at least one performance threshold.

6. The apparatus of claim 1 wherein the streams manager determines when the performance of the streaming application needs to be improved by comparing current performance of the streaming application to historical performance of the first streaming application.

7. The apparatus of claim 1 wherein, when the cloud manager determines multiple servers satisfy the request from the streams manager, the cloud manager determines from a log of hardware performance for the multiple servers on which of the multiple servers to provision the at least one virtual machine.

8. An apparatus comprising:
at least one processor;
a memory coupled to the at least one processor;
a streaming application residing in the memory and executed by the at least one processor, the streaming application comprising a flow graph that includes a plurality of operators that process a plurality of data tuples; and
a streams manager residing in the memory and executed by the at least one processor, the streams manager monitoring performance of the streaming application, and when the streams manager determines performance of at least two of the plurality of operators in the streaming application needs to be improved by comparing current performance of the streaming application to at least one performance threshold, the streams manager submits a request to a cloud manager to provision at least one virtual machine on a specified hardware type comprising a specified processor architecture with a specified hardware performance capacity, wherein the specified processor architecture comprises the same processor architecture currently executing the at least two operators, and after the cloud manager provisions the at least one virtual machine on the specified hardware type with the specified processor architecture that satisfies the specified hardware performance capacity, the streams manager modifies the flow graph to deploy the at least two operators to the at least one virtual machine.

9. An apparatus comprising:

at least one processor;

a memory coupled to the at least one processor;

a streaming application residing in the memory and executed by the at least one processor, the streaming application comprising a flow graph that includes a plurality of operators that process a plurality of data tuples; and a streams manager residing in the memory and executed by the at least one processor, the streams manager monitoring performance of the streaming application, and when performance of at least two of the plurality of operators in the streaming application needs to be improved by comparing current performance of the streaming application to historical performance of the first streaming application, the streams manager submits a request to a cloud manager to provision at least one virtual machine on a specified hardware type with a specified hardware performance capacity, wherein the specified hardware type comprises a same processor architecture currently executing the at least two operators, and after the cloud manager provisions the at least one virtual machine on the specified hardware type with the specified hardware performance capacity, the streams manager modifies the flow graph to deploy the at least two operators to the at least one virtual machine.

* * * * *